United States Patent
Chiang et al.

(10) Patent No.: US 10,452,187 B2
(45) Date of Patent: Oct. 22, 2019

(54) PRESSURE SENSING MODULE AND PRESSURE SENSING TOUCH CONTROL SYSTEM USING THE SAME

(71) Applicant: TPK Touch Solutions (Xiamen) Inc., Xiamen (CN)

(72) Inventors: Cheng-Chung Chiang, Kaohsiung (TW); Feng Chen, Fuzhou (CN); Ho-Hsun Chi, Hsinchu (TW); Chih-Cheng Chuang, Hsinchu (TW); Sun-Po Lin, Hsinchu (TW); Wei Wei, Jianyang (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 6 days.

(21) Appl. No.: 15/704,010

(22) Filed: Sep. 14, 2017

(65) Prior Publication Data

US 2018/0074638 A1 Mar. 15, 2018

(30) Foreign Application Priority Data

Sep. 14, 2016 (CN) .......................... 2016 1 0824127

(51) Int. Cl.
*G06F 3/041* (2006.01)
*G02F 1/1333* (2006.01)
*G06F 3/045* (2006.01)

(52) U.S. Cl.
CPC ........ *G06F 3/0414* (2013.01); *G02F 1/13338* (2013.01); *G06F 3/045* (2013.01); *G06F 3/0416* (2013.01); *G06F 3/0412* (2013.01)

(58) Field of Classification Search
CPC ...... G06F 3/0414; G06F 3/045; G06F 3/0412; G02F 1/13338
See application file for complete search history.

(56) References Cited

U.S. PATENT DOCUMENTS

| 2015/0309083 | A1* | 10/2015 | Matzen | ............. G01L 9/06 |
|---|---|---|---|---|
| | | | | 73/862.628 |
| 2016/0062497 | A1* | 3/2016 | Huppi | ............ G06F 3/0414 |
| | | | | 345/177 |
| 2016/0342257 | A1* | 11/2016 | Watazu | ............. G06F 3/0414 |
| 2017/0308221 | A1* | 10/2017 | Li | ............... G02B 6/0051 |

* cited by examiner

*Primary Examiner* — Abhishek Sarma
(74) *Attorney, Agent, or Firm* — Cooper Legal Group, LLC

(57) ABSTRACT

A pressure sensing module and a pressure sensing touch control system are provided. The pressure sensing module includes a sensing layer formed on a surface of a substrate. The sensing layer includes at least one pressure sensing unit including four resistors with the same resistance values. The four resistors form a Wheatstone bridge. Pattern shapes of two of the four resistors have the same extending directions, and the two of the four resistors are not disposed adjacent to each other. The pressure sensing touch control system includes a touch control sensing unit. The touch control sensing unit is disposed between the four resistors to achieve pressure sensing and position sensing of pressing action. In the present disclosure, a bridge circuit is disposed on a single surface to prevent the sensing for pressing with a finger from being affected by temperature and other noise.

20 Claims, 13 Drawing Sheets

111e

PRESSURE SENSING MODULE AND PRESSURE SENSING TOUCH CONTROL SYSTEM USING THE SAME

RELATED APPLICATION

This application claims the benefit of China Application Serial Number 201610824127.4, filed Sep. 14, 2016. The entire disclosures of all the above applications are hereby incorporated by reference herein.

BACKGROUND

Technical Field

The present disclosure relates to a field of pressure sensing. More particularly, the present disclosure relates to a pressure sensing module and a pressure sensing touch control system.

Description of Related Art

When a conventional intelligent touch control panel is pressed, at least one pressure sensing unit around the position being pressed receives a finger-pressing action, thus resulting in strain reaction such as deformation, deflection or shear, and leading to variation of electric characteristics of the at least one pressure sensing unit. In particular, when the pressure sensing unit is formed by bending piezoresistive material in a form of conductive wire, after the pressure sensing unit is pressed, a volume of the pressure sensing unit at a corresponding region is varied, thus affecting a resistance value of the pressure sensing unit.

In a conventional pressure sensing unit, piezoresistive material is often used as a fabrication material. With respect to common piezoresistive materials, pressing of a finger causes temperature transfer to the material, such that the temperature of the pressure sensing unit is varied accordingly, thus changing the resistance of the pressure sensing unit. The resistance change caused by the temperature variation impairs detection of the resistance change caused by the pressing of the finger, thus greatly decreasing the accuracy of the pressure sensing.

To suppress the noise problem caused by the temperature, a pressure sensing module in the present market often adopts a relatively complicated multi-layered structure, in which a reference electrode layer is disposed under an original pressure sensing unit, such that the reference electrode layer and the original pressure sensing unit form a bridge circuit for compensation of temperature.

SUMMARY

To overcome the problems of complicated structure and fabrication process, the present disclosure provides a pressure sensing module and a pressure sensing touch control system each having a simple a structure and high accuracy.

To solve the above technical problems, the present disclosure provides a technical proposal as follow: a pressure sensing module at least including a substrate and a sensing layer. The sensing layer is formed on a surface of the substrate, the sensing layer includes at least one pressure sensing unit, the pressure sensing unit includes four resistors with the same resistance value, the four resistors form a Wheatstone bridge, in which pattern shapes of two of the four resistors have the same extending directions and are not disposed adjacent to each other.

Preferably, the two resistors having the pattern shapes having the same extending directions are disposed diagonally.

Preferably, two of the four resistors with the pattern shapes having the same extending directions are defined as a first resistor group, the other two of the four resistors are defined as a second resistor group, and an extending direction of the first resistor group is different from an extending direction of the second resistor group.

Preferably, the extending direction of a pattern shape of the first resistor group is perpendicular to the extending direction of a pattern shape of the second resistor group.

Preferably, a total projection length of a pattern shape of one of the resistors along a first direction is greater than a total projection length of the pattern shape of the one of the resistors along a second direction.

Preferably, the first resistor group includes a first resistor and a second resistor, the second resistor group includes a third resistor and a fourth resistor, each of the first resistor, the second resistor, the third resistor and the fourth resistor is formed from a metal wire, and a node is disposed on each of two ends of the metal wire.

Preferably, the first resistor includes a first node and a second node, the second resistor includes a third node and a fourth node, the third resistor includes a fifth node and a sixth node, the fourth resistor includes a seventh node and an eighth node, and the pressure sensing module further includes a joint region.

Preferably, the first node and the fifth node are electrically connected within the joint region to form a first input port within the joint region, the second node and the third node are electrically connected within the joint region to form a first output port within the joint region, the fourth node and the eighth node are electrically connected within the joint region to form a second input port within the joint region, and the sixth node and the seventh node are electrically connected within the joint region to form a second output port within the joint region.

Preferably, the first node and the fifth node form a first input port through pattern shape electric connection, the second node and the third node form a first output port through pattern shape electric connection, the fourth node and the eighth node form a second input port through pattern shape electric connection, the sixth node and the seventh node form a second output port through pattern shape electric connection, and the first output port, the second output port, the first input port and the second input port are independently wired to the joint region.

Preferably, the first node and the fifth node are independently wired to the joint region, and are electrically connected within the joint region to form a first input port, the second node and the third node form a first output port through pattern shape electric connection, the fourth node and the eighth node are independently wired to the joint region, and are connected within the joint region to form the second input port, and the sixth node and the seventh node form a second output port through pattern shape form the second input port, and the first output port and the second output port are independently wired to the joint region and connected within the joint region.

Preferably, a width of the sensing layer is not equal to a length of the sensing layer.

Preferably, the four resistors are adjacent disposed, and a distance between two adjacent resistors of the four resistors is in a range from 1 mm to 10 mm.

Preferably, a distribution density of the pressure sensing units disposed on a surface of the sensing layer is at least 1 per cm$^2$.

Preferably, time-division scanning is performed on the pressure sensing unit, so as to enable the pressure sensing unit to perform pressure sensing on pressing of a finger for the pressure sensing module in a first time interval, and to perform positon sensing on the pressing of the finger for the pressure sensing module in the second time interval.

To solve the above technical problems, the present disclosure provides another technical proposal as follow: a pressure sensing touch control system at least including a substrate and a sensing layer formed on a surface of the substrate. The sensing layer includes at least one pressure sensing unit and at least one touch control sensing unit, the pressure sensing unit includes four resistors with the same resistance values, the four resistors form a Wheatstone bridge, pattern shapes of two of the four resistors have the same extending direction and are not disposed adjacent to each other, and the touch control sensing unit is disposed between the four resistors.

Preferably, a pattern shape of the touch control sensing unit and the pattern shapes of the four resistors are complementary.

Preferably, the two resistors having the pattern shapes having the same extending directions are disposed diagonally.

Preferably, two resistors with the pattern shapes having the same extending direction are defined as a first resistor group, the other two resistors are defined as a second resistor group, and an extending direction of the first resistor group is perpendicular to an extending direction of the second resistor group.

Preferably, the first resistor group includes a first resistor and a second resistor, the second resistor group includes a third resistor and a fourth resistor, each of the first resistor, the second resistor, the third resistor and the fourth resistor is formed from a metal wire, and a node is disposed on each of two ends of the metal wire.

Preferably, the first resistor includes a first node and a second node, the second resistor includes a third node and a fourth node, the third resistor includes a fifth node and a sixth node, the fourth resistor includes a seventh node and an eighth node, and the pressure sensing module further includes a joint region.

Preferably, the first node and the fifth node are electrically connected within the joint region to form a first input port within the joint region, the second node and the third node are electrically connected within the joint region to form a first output port within the joint region, the fourth node and the eighth node are electrically connected within the joint region to form a second input port within the joint region, and the sixth node and the seventh node are electrically connected within the joint region to form a second output port within the joint region.

Preferably, the first node and the fifth node are independently wired to the joint region, and are electrically connected within the joint region to form a first input port, the second node and the third node form a first output port through pattern shape electric connection, the fourth node and the eighth node are independently wired to the joint region, and are connected within the joint region to form the second input port, and the sixth node and the seventh node form a second output port through pattern shape form the second input port, and the first output port and the second output port are independently wired to the joint region and connected within the joint region.

Preferably, a width of the sensing layer is not equal to a length of the sensing layer.

Preferably, the four resistors are adjacent disposed, and a distance between two adjacent resistors of the four resistors is in a range from 1 mm to 10 mm.

Preferably, time-division scanning is performed on the pressure sensing unit, so as to enable the pressure sensing unit to perform a pressure sensing on pressing of a finger for the pressure sensing module in a first time interval, and to perform a positon sensing on the pressing of the finger for the pressure sensing module in the second time period.

Preferably, the pressure sensing touch control system further includes at least one selection chip and a pressure sensing circuit and a touch control sensing circuit corresponding to the selection chip, wherein in a first time interval, the selection chip enables the pressure sensing unit to be conductively connected to the pressure sensing circuit, and in a second time interval, the selection chip enables the pressure sensing unit and the touch control sensing unit to be conductively connected to the touch control sensing circuit individually.

Compared with conventional technologies, the pressure sensing module and the pressure sensing touch control system provided by the present disclosure have advantages described as follow:

The pressure sensing module has a sensing layer formed on a surface of a substrate. The sensing layer includes at least one pressure sensing unit, the pressure sensing unit includes four resistors with the same resistance values, and the four resistors form a Wheatstone bridge, in which pattern shapes of two of the resistors have the same extending direction, and two resistors with the pattern shapes having the same extending direction are not disposed adjacent to each other. The pressure sensing module of the present disclosure is adopted to overcome distortion of a sensing signal representing a magnitude of a pressing force, in which the distortion of the sensing signal is caused by a variance of the sensing signal that is generated when the pressure sensing module is affected by the ambience (for example, temperature). In the present disclosure, a bridge circuit is disposed on a single surface to solve problems of temperature and other noise, and a fabrication method of the bridge circuit disposed on a single surface is more simplified and a cost of the fabrication method is lower. The pressure sensing module provided by the present disclosure further has advantages of simple structure and high accuracy of sensing.

The pressure sensing touch control system includes a sensing layer formed on a substrate. The sensing layer includes at least one pressure sensing unit and at least one touch control sensing unit. The pressure sensing unit includes four resistors having the same resistance. The touch control sensing unit is disposed between the four resistors. By arranging the pressure sensing unit and the touch control sensing unit on the same surface, electrodes thereof can be disposed on a single surface, thereby eliminating the influence of the factors such as temperature on the pressing of the finger, so as to achieve high accuracy and sensitivity of the sensing for pressure and a positon of touch control.

BRIEF DESCRIPTION OF THE DRAWINGS

The disclosure can be more fully understood by reading the following detailed description of the embodiment, with reference made to the accompanying drawings as follows.

DETAILED DESCRIPTION

To clarify and simplify the purpose, technologies and advantages of the present disclosure, detailed description is followed with several figures and embodiments. It is noted that the described embodiments herein are merely used to explain, but not to limit, the present disclosure.

Methods for fabricating multi-layered pressure sensing structures require many production operations, the fabrication process is complicated, and the thickness of the pressure sensing module is increased. Further, in such multiple-layer structures, heating of a single resistor of the bridge circuit often occurs, thus lowering signal-to-noise ratio and sensing accuracy of the pressure sensing module.

Figure 1:
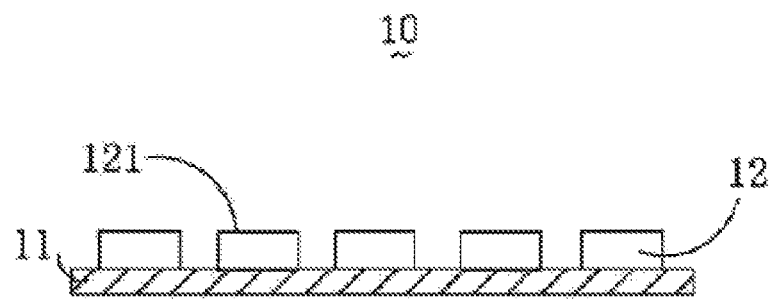
FIG. 1 is a schematic diagram showing a structure of a pressure sensing module in an intelligent display screen provided by the present disclosure.
Figure 2:
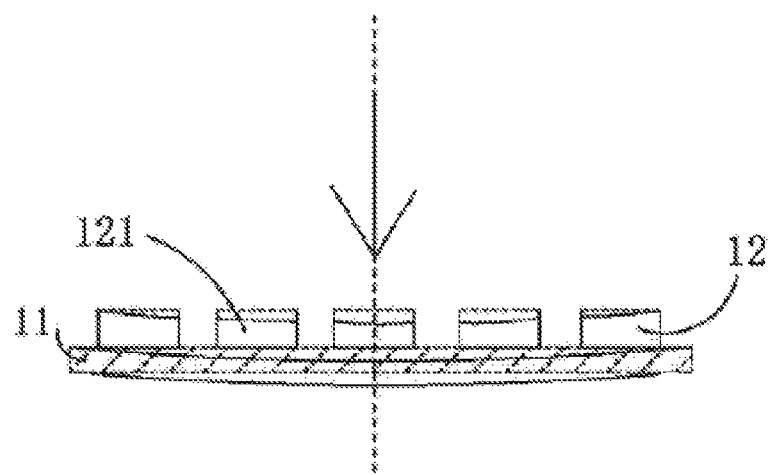
FIG. 2 is a schematic diagram showing deformation of a pressure sensing module after receiving a finger-pressing action.

To solve the above technical problems, a first embodiment of the present disclosure provides a pressure sensing module 10, as shown in FIG. 1 and FIG. 2. The sensing module 10 includes a substrate 11 and a sensing layer 12 formed on a surface of the substrate 11 (in the present disclosure, positon terms "on" and "under" are merely limited to indicate relative positions on a diagram). The sensing layer 12 includes plural pressure sensing units 121. When the pressure sensing module 10 is pressed by a finger, volumes of the pressure sensing units 121 are varied due to a pressure of the finger, thus affecting resistance values of the pressure sensing units 121.

Figure 3:
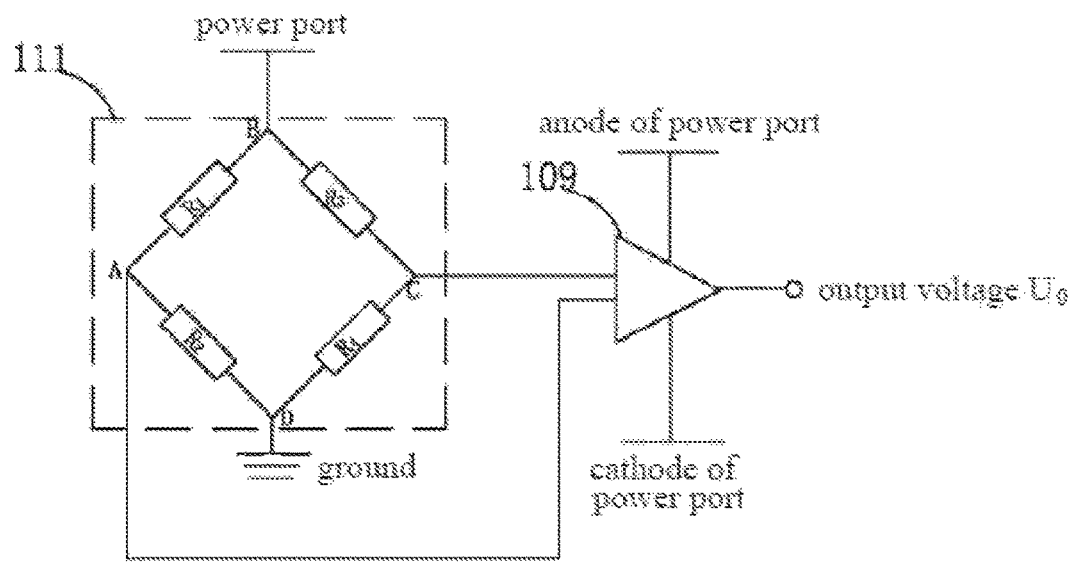
FIG. 3 is a schematic diagram showing a circuit of a single bridge circuit of a pressure sensing module provided by at least one embodiment of the present disclosure.
Figure 4:
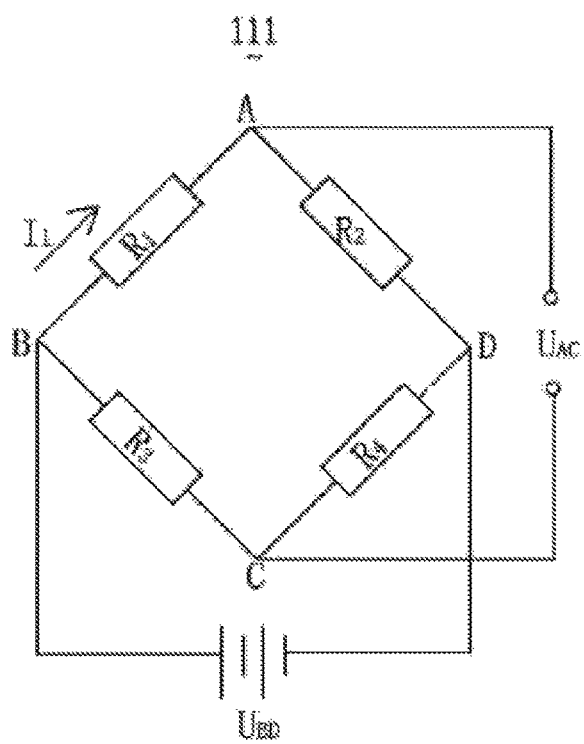
FIG. 4 is a schematic diagram showing an equivalent circuit of the equal arm bridge in a pressure sensing module provided by at least one embodiment of the present disclosure.

Referring to FIG. 3 and FIG. 4 simultaneously, each of the pressure sensing units 121 is a bridge circuit 111 disposed independently. The bridge circuit 111 can be formed by four resistors. The four resistors have the same resistance values. The four resistors include a resistor $R_1$, a resistor $R_2$, a resistor $R_3$ and a resistor $R_4$. The resistor $R_1$ and the resistor $R_2$ are connected in series, the resistor $R_3$ and the resistor $R_4$ are connected in series, and then the two series circuits are connected in parallel to form a Wheatstone bridge. Further, a first power port is connected to a point between the resistor $R_1$ and the resistor $R_3$, and a ground port is connected to a point between the resistor $R_2$ and the resistor $R_4$. As shown in FIG. 3, a terminal C and a terminal A of the bridge circuit 111 are connected to an amplifier 109 to output signals, and the amplifier 109 is connected to an anode of a power and a cathode of the power.

Further, as shown in FIG. 4, when no pressing pressure is applied on the sensing module 10, the bridge circuit 111 is in a balanced state. When a pressing pressure is applied on the sensing module 10, one or more bridge circuits 111 located adjacent a position which is pressed are deformed to vary a resistance value of the pressure sensing unit 121, and then the balanced state of the Wheatstone bridge is broken to result in a variation of the output voltage difference signal $U_0$ (a voltage difference signal $U_{AC}$ as shown in FIG. 4). Different pressures correspond to different variances of the resistance value, and different voltage difference signals are generated accordingly. Therefore, by calculating and processing the voltage difference signal $U_0$ of the Wheatstone bridge, a corresponding pressure value is obtained. In the following equations, $R_1$, $R_2$, $R_3$ and $R_4$ are used to represent the resistance value of $R_1$, the resistance value of $R_2$, the resistance value of $R_3$ and the resistance value of R, respectively.

A voltage drop across the resistor $R_1$ can be represented as follows:

$$U_{AB} = I_1 R_1 = \frac{R_1}{R_1 + R_2} U_{BD} \qquad (1)$$

A voltage drop across the resistor $R_3$ can be represented as follows:

$$U_{BC} = \frac{R_3}{R_3 + R_4} U_{BD} \quad (2)$$

The voltage $U_0$ outputted by the bridge circuit can be represented as follows:

$$U_0 = U_{AB} - U_{BC} = \frac{R_1 R_4 - R_2 R_3}{(R_1 + R_2)(R_3 + R_4)} U_{BD} \quad (3)$$

It can be understood from the equation (3) that the voltage $U_0$ outputted by the bridge circuit 111 is equal to 0 when $R_1 R_4 = R_2 R_3$, and the bridge circuit 111 is in the balanced state.

Further, it is assumed that the variances of the resistance values of the bridge arm resistors of the bridge circuit 111 in the balanced state can be respectively represented as $\Delta R_1$, $\Delta R_2$, $\Delta R_3$ and $\Delta R_4$, the voltage $U_0$ outputted by the bridge circuit 111 can be further represented as follows:

$$U_0 = \quad (4)$$
$$U_{AB} - U_{BC} = \frac{(R_1 + \Delta R_1)(R_4 + \Delta R_4) - (R_2 + \Delta R_2)(R_3 + \Delta R_3)}{(R_1 + \Delta R_1 + R_2 + \Delta R_2)(R_3 + \Delta R_3 + R_4 + \Delta R_4)} U_{BD}$$

If the balance condition $R_1 R_4 = R_2 R_3$ is substituted into the equation (4), and then high-order infinitesimals are omitted when $\Delta R$ is much smaller than $R$, the voltage outputted by the bridge circuit can be represented as follows:

$$U_0 = U_{BD} \frac{R_1 R_2}{(R_1 + R_2)^2} \left( \frac{\Delta R_1}{R_1} - \frac{\Delta R_2}{R_2} - \frac{\Delta R_3}{R_3} + \frac{\Delta R_4}{R_4} \right) \quad (5)$$

In the present disclosure, the resistors of the bridge circuit 111 have the same resistance values. It means that $R_1 = R_2 = R_3 = R_4 = R$. Therefore, the above equation (5) can be further represented as follow:

$$U_0 = \frac{U_{BD}}{4} \left( \frac{\Delta R_1}{R_1} - \frac{\Delta R_2}{R_2} - \frac{\Delta R_3}{R_3} + \frac{\Delta R_4}{R_4} \right) \quad (6)$$

Further, if all the four resistors of the bridge circuit 111 (the resistor $R_1$, the resistor $R_2$, the resistor $R_3$ and the resistor $R_4$) are strain sheets and have the same sensitivity K, after the sensing layer 12 is pressed by the finger, a relationship between a ratio of a variance of the resistance value generated by the pressing of the finger to an initial resistance value of a corresponding resistor and the strain of the resistor after being affected by the pressing is represented as follows:

$$\Delta R/R = K\varepsilon \quad (7)$$

Combining the above equation (6) with the equation (7), the voltage $U_0$ outputted by the bridge circuit 111 can be represented as follows:

$$U_0 = \frac{U_{BD} K}{4} (\varepsilon_1 - \varepsilon_2 - \varepsilon_3 + \varepsilon_4) \quad (8)$$

It can be understood from the above equation (8) that the voltage $U_0$ outputted by the bridge circuit 111 is associated with the strains of the four resistors. To further simplify the above equation (8), the bridge circuit 111 includes two resistors with two pattern shapes having the same extending directions.

Figure 5A:
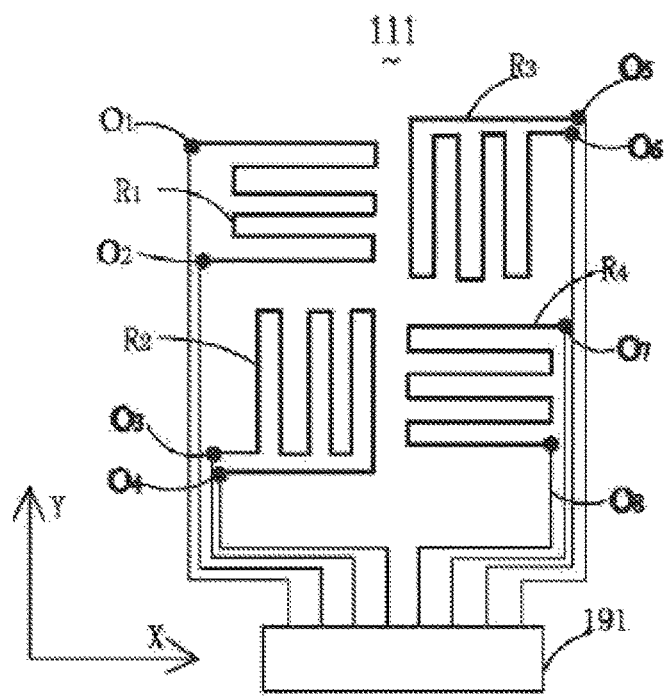
FIG. 5A is a schematic diagram showing structures of pattern shapes of four resistors in a pressure sensing module provided by a first specific implementation manner of at least one embodiment of the present disclosure and wires thereof.

Specifically, in a first specific implementation manner of the first embodiment of the present disclosure, as shown in FIG. 5A, the pattern shapes of the resistor $R_1$ and the resistor $R_4$ have the same extending directions, and the pattern shapes of the resistor $R_2$ and the resistor $R_3$ have the same extending directions, thereby enabling the bridge circuit 111 to have an X-direction strain and a Y-direction strain identical to the extending directions. The extending direction mentioned herein and hereinafter means that, when a total projection length of the pattern shape of the resistor along a direction is greater than that along another direction, the direction corresponding to the greater total projection length is defined as the extending direction of the pattern shape of the resistor.

Figure 5B:
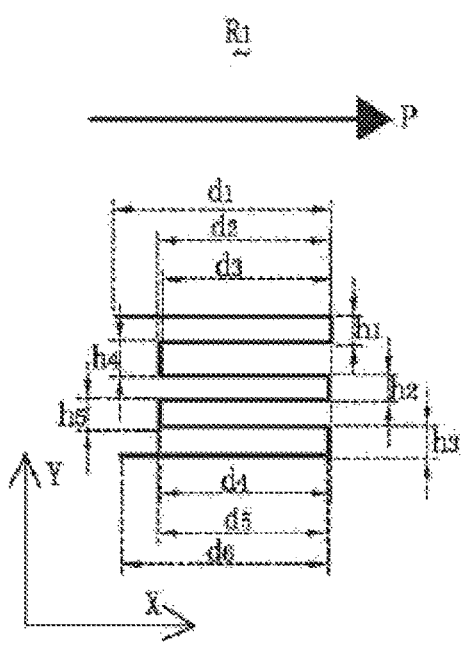
FIG. 5B is a schematic diagram showing a total projection length of t a resistor $R_1$ shown in FIG. 5A.

Specifically, the resistor $R_1$ in FIG. 5A is used as an example. A total projection length of the resistor $R_1$ can be divided into a total projection length d along the X-direction and a total projection length h along the Y-direction. The pattern shape along the X-direction or the Y-direction is divided into plural segments, as shown in FIG. 5B. The total projection length d along the X-direction is equal to a sum of the lengths of a segment $d_1$, a segment $d_2$, a segment $d_3$, a segment $d_4$, a segment $d_5$, and a segment $d_6$, and the total projection length h along the Y-direction is equal to a sum of the lengths of a segment $h_1$, a segment $h_2$, a segment $h_3$, a segment $h_4$, and a segment $h_5$. It can be understood from the FIG. 5B that the total projection length d along the X-direction is greater than the total projection length h along the Y-direction, and thus a direction of the total projection length d of the resistor $R_1$ along the X-direction is defined as an extending direction P of the resistor $R_1$.

By using the above method, the extending directions of the resistor $R_2$, the resistor $R_3$ and the resistor $R_4$ can be obtained respectively, and thus specific process thereof are not repeated herein.

In the present disclosure, two resistors with the pattern shapes having the same extending directions are not disposed adjacent to each other. It means that the extending directions of the resistor $R_1$ and the resistor $R_4$ are the direction of the total projection length d along the X-direction, and the resistor $R_1$ and the resistor $R_4$ are not disposed adjacent to each other. The extending directions of the resistor $R_2$ and the resistor $R_3$ are the direction of the total projection length h along the Y-direction, and the resistor $R_2$ and the resistor $R_3$ are not disposed adjacent to each other. It can be understood that "two resistors are not disposed adjacent to each other" herein and hereinafter means that the two resistors are not disposed adjacent to each other along the X-direction or the Y-direction.

Further, the two resistors with the pattern shapes having the same extending directions are disposed diagonally. It means that the resistor $R_1$ and the resistor $R_4$ are disposed diagonally, and the resistor $R_2$ and the resistor $R_3$ are disposed diagonally.

In some preferred embodiments, in the pressure sensing unit 121 (i.e., the bridge circuit 111), two resistors with the pattern shapes having the same extending directions are defined as a first resistor group, and the other two resistors with the pattern shapes having the same extending directions are defined as a second resistor group. The extending direction of the pattern shape of the first resistor group is different from the extending direction of the pattern shape of the second resistor group. It means that the first resistor group includes the resistor $R_1$ and the resistor $R_4$, and the second resistor group includes the resistor $R_2$ and the resistor $R_3$.

Preferably, the extending direction of the pattern shape of the first resistor group is perpendicular to the extending direction of the pattern shape of the second resistor group. It means that, the extending direction of the pattern shapes of the resistor $R_1$ and the resistor $R_4$ is perpendicular to the extending direction of the pattern shapes of the resistor $R_2$ and the resistor $R_3$. Specifically, the total projection length of the pattern shapes of the resistor $R_1$ and the resistor $R_4$ along a first direction is greater than the total projection length of the pattern shapes of the resistor $R_1$ and the resistor $R_4$ along a second direction, and the total projection length of the pattern shapes of the resistor $R_2$ and the resistor $R_3$ along the second direction is greater than the total projection length of the pattern shapes of the resistor $R_2$ and the resistor $R_3$ along the first direction. The first direction is perpendicular to the second direction.

In this embodiment, only one pressure sensing unit 121 (i.e., the bridge circuit 111) in the sensing layer 12 is used as an example for illustrating a specific layout and a construction relationship of the resistors. For actual practice, the sensing layer 12 may include one or more pressure sensing units 121 having different pattern shapes of resistors or distribution fashions.

In this embodiment, each of the resistors (the resistor $R_1$, the resistor $R_2$, the resistor $R_3$ and the resistor $R_4$) is formed from a metal wire, and a node is disposed on each of two ends of the metal wire.

The resistor $R_1$ is defined as a first resistor, the resistor $R_2$ is defined as a second resistor, the resistor $R_3$ is defined as a third resistor and the resistor $R_4$ is defined as a fourth resistor, in which one resistor is defined between two nodes, as shown in FIG. 5A. The resistor $R_1$ includes a first node $O_1$ and a second node $O_2$, the resistor $R_2$ includes a third node $O_3$ and a fourth node $O_4$, the resistor $R_3$ includes a fifth node $O_5$ and a sixth node $O_6$, and the resistor $R_4$ includes a seventh node $O_7$ and an eighth node $O_8$.

To enable the resistor $R_1$, the resistor $R_2$, the resistor $R_3$ and the resistor $R_4$ to form a Wheatstone bridge and achieve electric connection, in this embodiment, as shown in FIG. 5A, the pressure sensing module 10 further includes a joint region 191, and the resistors $R_1$-$R_4$ are independently wired to the joint region 191. The joint region 191 is used to achieve input and output of electric signals of the pressure sensing module 10. Specifically, the eight nodes are wired to the joint region 191, and electric connections of the eight nodes are achieved at the joint region 191.

Specifically, the first node $O_1$ and the fifth node $O_5$ are electrically connected within the joint region 191 to form a first input port (i.e., the terminal B in FIG. 3 and FIG. 4) within the joint region 191.

The second node $O_2$ and the third node $O_3$ are electrically connected within the joint region 191 to form a first output port (i.e., the terminal A in FIG. 3 and FIG. 4) within the joint region 191.

The fourth node $O_4$ and the eighth node $O_8$ are electrically connected within the joint region 191 to form a second input port (i.e., the terminal D in FIG. 3 and FIG. 4) within the joint region 191.

The sixth node $O_6$ and the seventh node $O_7$ are electrically connected within the joint region 191 to form a second output port (i.e., the terminal C in FIG. 3 and FIG. 4) within the joint region 191.

Further, in some preferred embodiments, material of the metal wire includes but is not limited to copper, silver, aluminum, gold or combination thereof. The metal wire includes a material, a variance of a resistance value of which after being pressed by the finger is mainly caused by volume variance. Therefore, the bridge circuit 111 can sense strain along the first direction or the second direction after receiving the finger-pressing action.

Specifically, referring to FIG. 1 and FIG. 5A simultaneously, the first direction corresponds to the X-direction, and the second direction corresponds to the Y-direction. The four resistors in the first pressure sensing unit 121 (i.e., the bridge circuit 111) are arranged in a matrix and formed on the substrate 11 by using an etching process. In a single bridge circuit 111, the two resistors disposed diagonally (i.e., the resistor $R_1$ and the resistor $R_4$) adopt a shape of comb-tooth lines having an extending direction equal to the first direction (X-direction), and the other two resistors disposed diagonally (i.e., the resistor $R_2$ and the resistor $R_3$) adopt a shape of comb-tooth lines having an extending direction equal to the second direction (Y-direction). Such designs enable a variance of resistance values sensed by the bridge circuit adopting the shape of comb-tooth lines along the X-direction to be different from the variance of resistance values sensed by the bridge circuit adopting the shape of comb-tooth lines along the Y-direction, thereby increasing output voltage values of the bridge circuit 111. Because the four resistors in the bridge circuit 111 are close to each other, temperature variances of the four resistors caused by heating the four resistors are substantially close to each other, and deformation degrees of the four resistors caused by applying forces on the four resistors are substantially close to each other. Therefore, a condition that only one of the four resistors is heated is rare, and a condition that forces applied on the four resistors are not uniform is rare.

Further, as shown in FIG. 5A, if distances between two adjacent comb-tooth like resistors are too long, the temperature affections on the four resistors are not the same, and thus strains caused by temperature are different, thereby enabling the output voltage $U_0$ caused by temperature to be not zero and affecting the balance of the bridge circuit. However, if distances between two adjacent comb-tooth like resistors are too short, a signal-to-noise ratio variation caused by a magnitude of a force of the pressing with a finger. Therefore, to obtain better sensing performance, in the present disclosure, a distance between the pattern shapes of two adjacent resistors in the resistors R1-R4 is in a range from 1 mm to 10 mm. Preferably, the distance between the pattern shapes of two adjacent resistors is in a range from 3 mm to 7 mm or 4 mm to 5.5 mm. Most preferably, the distance between the pattern shapes of two adjacent resistors is 5 mm.

In this specific implementation manner, because the resistor $R_1$, the resistor $R_2$, the resistor $R_3$ and the resistor $R_4$ in the bridge circuit 111 have the same resistance values, and it is assumed that the four resistors receive the same force of pressing of the finger, and variance of the resistance values of the four resistors caused by variance of the temperature are the same, in accordance with the equation (7) $\Delta R/R = K\varepsilon$ (K is sensitivity), it can be understood that a relationship between strains generated after the resistor $R_1$, the resistor $R_2$, the resistor $R_3$ and the resistor $R_4$ are pressed can be represented as: $\varepsilon_1 = \varepsilon_4 = \varepsilon_x$, and $\varepsilon_2 = \varepsilon_3 = \varepsilon_y$. Therefore, the above equation (8) can be further rewritten as follow:

$$U_0 = \frac{U_{BD}K}{4}(\varepsilon_x - \varepsilon_y - \varepsilon_y + \varepsilon_x) = \frac{U_{BD}K}{2}(\varepsilon_x - \varepsilon_y) \qquad (9)$$

It can be understood from the above equation (9) that the above voltage $U_{BD}$ can be obtained by performing a measurement task, K is a sensitivity of resistance related to the material of the metal wire, the strain along the X-direction after the bridge circuit 111 is affected by the pressing is represented by $\varepsilon_x$, the strain along the Y-direction after the bridge circuit 111 is affected by the pressing is represented by $\varepsilon_y$, and values of the strains can obtained by measuring the resistance strain sheets.

It is to be appreciated that the output voltage $U_0$ of the bridge circuit 111 obtained through calculation of the equation (9) is associated with an absolute value of a difference between the strain $\varepsilon_x$ along the X-direction and the strain $\varepsilon_y$ along the Y-direction after the bridge circuit 111 receives a finger-pressing action.

In some preferred embodiments of the present disclosure, to enable the difference between the strain $\varepsilon_x$ along the X-direction and the strain $\varepsilon_y$ along the Y-direction after the bridge circuit 111 receives the finger-pressing action to be greater, a ratio of length to width of the sensing layer 12 can be arranged to be not equal to 1. It means that a length of the sensing layer 12 along the X-direction is different a length of the sensing layer 12 along the Y-direction.

Figure 6:
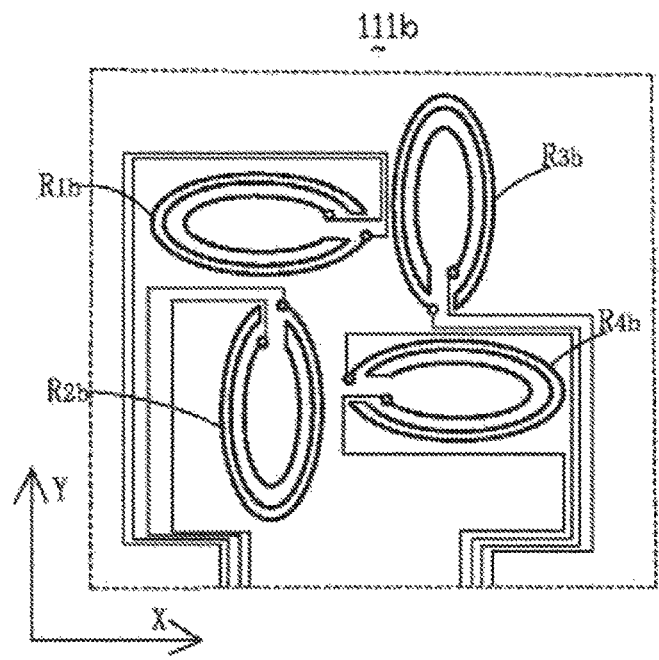
FIG. 6 is a schematic diagram showing a second specific implementation manner of structures of the pattern shapes of the four resistors in FIG. 5A and wires thereof.

As shown in FIG. 6, a second specific implementation manner of the first embodiment of the present disclosure is provided. A difference between the second specific implementation manner and the first specific implementation manner is that the bridge circuit 111b includes a resistor $R_{1b}$, the resistor $R_{2b}$, the resistor $R_{3b}$ and the resistor $R_{4b}$, and a pattern shape of each of the resistors $R_{1b}$-$R_{4b}$ is an ellipse wired shape. The ellipse wired pattern shape has a maximum projection length along a direction of a major axis of the ellipse of the ellipse wired pattern shape, and the direction of the major axis is defined as an extending direction of the pattern shape. An extending direction of the resistor $R_{1b}$ and an extending direction of the resistor $R_{4b}$ are parallel with the X-direction, and an extending direction of the resistor $R_{2b}$ and an extending direction of the resistor $R_{3b}$ are parallel with the Y-direction.

Figure 7:
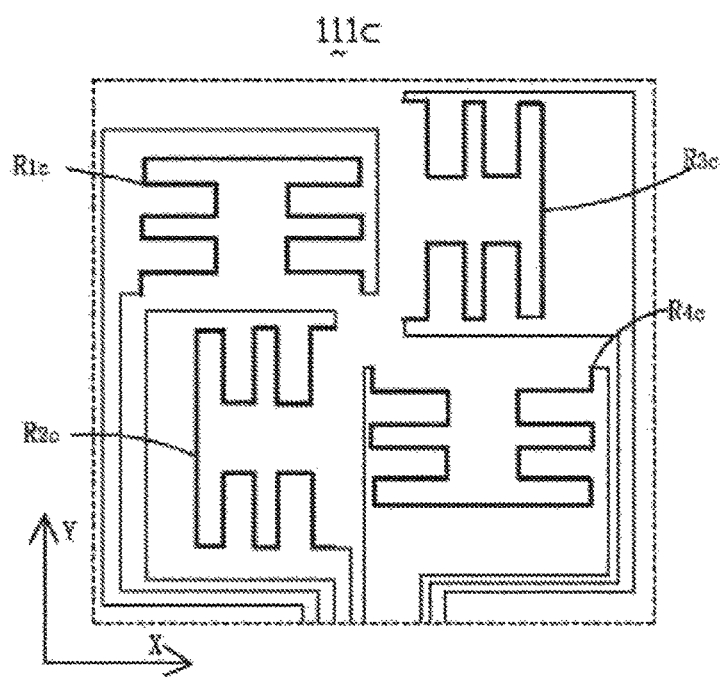
FIG. 7 is a schematic diagram showing a third specific implementation manner of structures of the pattern shapes of the four resistors in FIG. 5A and wires thereof.

As shown in FIG. 7, a third specific implementation manner of the first embodiment of the present disclosure is provided. A difference between the third specific implementation manner and the second specific implementation manner is that the bridge circuit 111c includes a resistor $R_{1c}$, the resistor $R_{2c}$, the resistor $R_{3c}$ and the resistor $R_{4c}$ and a pattern shape of each of the resistors $R_{1c}$-$R_{4c}$ is a fence bending wire shape. For example, the fence bending wire pattern shape can be a "three lateral lines with a vertical line" structure. An extending direction of the resistor $R_{1c}$ and an extending direction of the resistor $R_{4c}$ are parallel with the X-direction, and an extending direction of the resistor $R_{2c}$ and an extending direction of the resistor $R_{3c}$ are parallel with the Y-direction.

Figure 8:
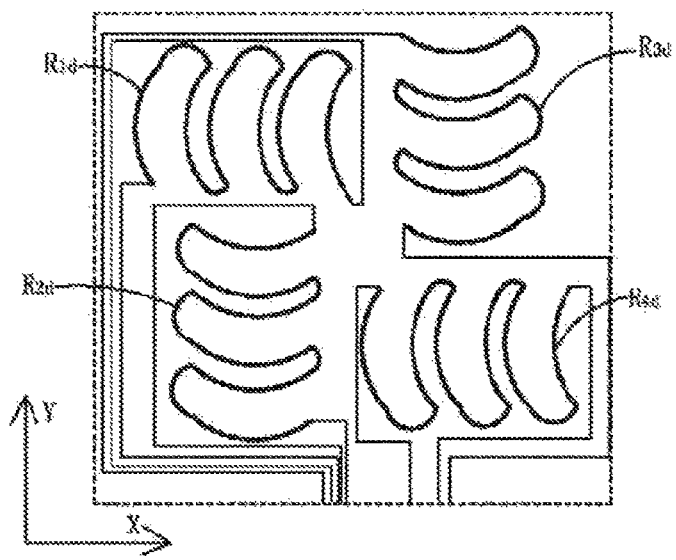
FIG. 8 is a schematic diagram showing a fourth specific implementation manner of structures of the pattern shapes of the four resistors in FIG. 5A and wires thereof.

As shown in FIG. 8, a fourth specific implementation manner of the first embodiment of the present disclosure is provided. A difference between the fourth specific implementation manner and the second specific implementation manner is that the bridge circuit 111d includes a resistor $R_{1d}$, the resistor $R_{2d}$, the resistor $R_{3d}$ and the resistor $R_{4d}$ and a pattern shape of each of the resistors $R_{1d}$-$R_{4d}$ is a curved shape. An extending direction of the resistor $R_{1d}$ and an extending direction of the resistor $R_{4d}$ are parallel with the X-direction, and an extending direction of the resistor $R_{2d}$ and an extending direction of the resistor $R_{3d}$ are parallel with the Y-direction.

Figure 9:
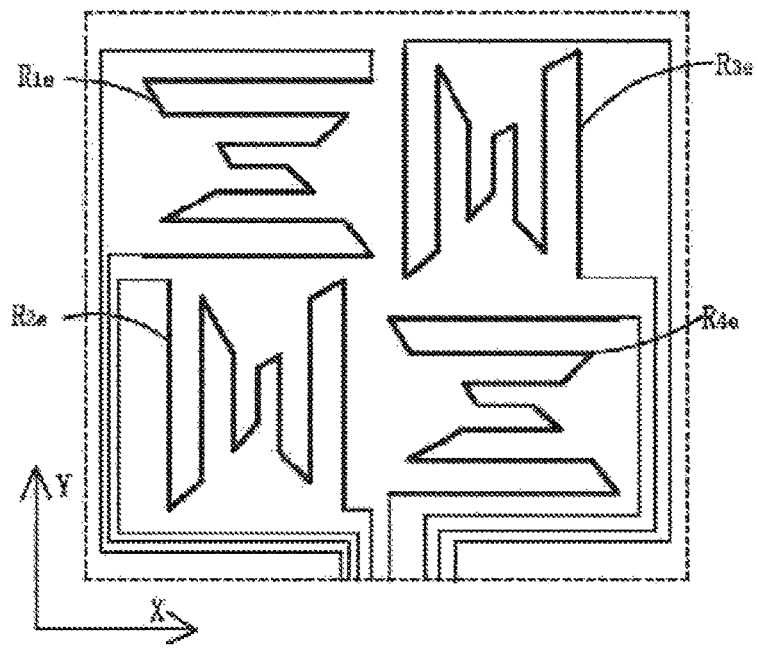
FIG. 9 is a schematic diagram showing a fifth specific implementation manner of structures of the pattern shapes of the four resistors in FIG. 5A and wires thereof.

As shown in FIG. 9, a fifth specific implementation manner of the first embodiment of the present disclosure is provided. A difference between the fourth specific implementation manner and the second specific implementation manner is that the bridge circuit 111e includes a resistor $R_{1e}$, the resistor $R_{2e}$, the resistor $R_{3e}$ and the resistor $R_{4e}$ and a pattern shape of each of the resistors $R_{1e}$-$R_{4e}$ is a shape of bending lines having unequal lengths. Specifically, the shape of bending lines having unequal lengths is based on metal wires along the first direction, and the lengths of the metal lines vary from gradually increasing to gradually decreasing along the first direction. An extending direction of the resistor $R_{1e}$ and an extending direction of the resistor $R_{4e}$ are parallel with the X-direction, and an extending direction of the resistor $R_{2e}$ and an extending direction of the resistor $R_{3e}$ are parallel with the Y-direction.

In the specific implementation manners from the first specific implementation manner to the fifth specific implementation manner, the four resistors can be independently wired to the joint region 191, and corresponding input ports and output ports can be formed in within the joint region 191.

Figure 10:
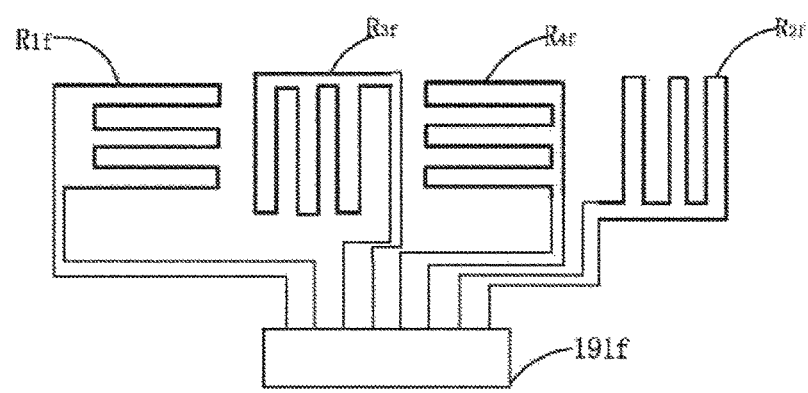
FIG. 10 is a schematic diagram showing a sixth specific implementation manner of structures of the pattern shapes of the four resistors in FIG. 5A and wires thereof.

Further, as shown in FIG. 10, in a sixth specific implementation manner of the first embodiment of the present disclosure, the bridge circuit 111f includes a resistor $R_{1f}$, the resistor $R_{2f}$, the resistor $R_{3f}$ and the resistor $R_{4f}$ having the same resistance values. The resistor $R_{1f}$, the resistor $R_{2f}$, the resistor $R_{3f}$ and the resistor $R_{4f}$ are arranged in parallel, and independently wired to a joint region 191f. In other modified implementation manners, to be adapted for environments having different pressures to be sensed, the resistors $R_{1f}$-$R_{4f}$ can be arranged in other arrangements, and the arrangements of the resistors $R_{1f}$-$R_{4f}$ are not limited herein.

In further other embodiments of the present disclosure, in a condition that the resistor $R_1$, the resistor $R_2$, the resistor $R_3$ and the resistor $R_4$ are guaranteed to have the same resistance values, the pattern shapes of the resistors $R_1$-$R_4$ can be the same as or different from each other. The above specific implementation manners are merely used as illustration examples, and the present disclosure is not limited thereto.

To form a pressure sensing module used to be input through touch control, it is required to add elements, such as a selection chip, to the pressure sensing module provided by the first embodiment.

Figure 11:
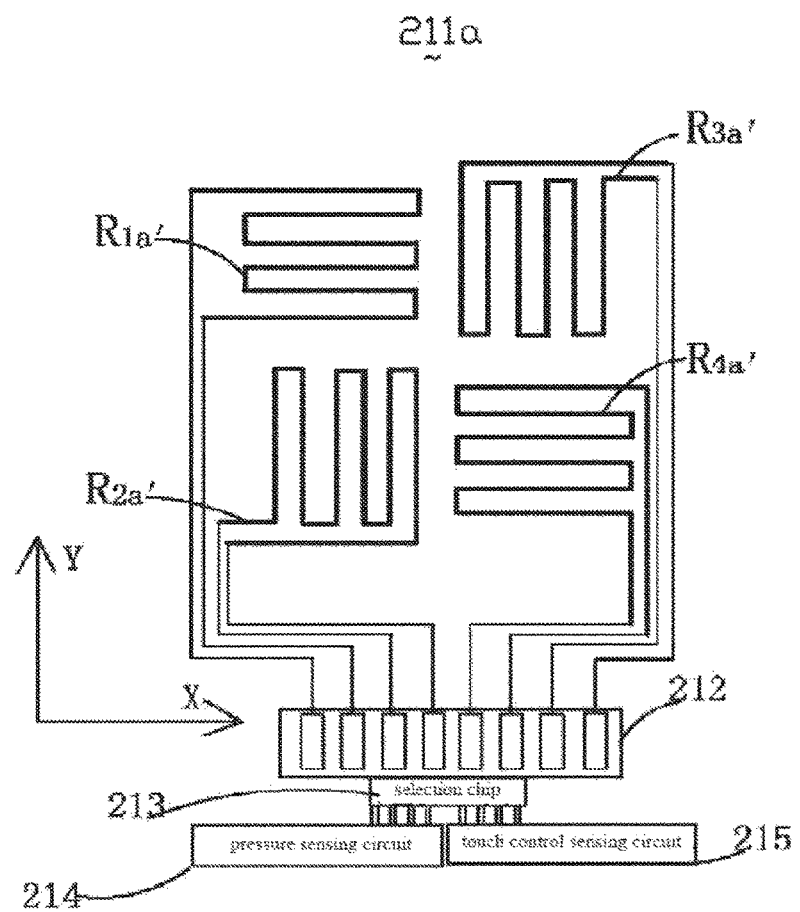
FIG. 11 is a schematic diagram showing a relationship of circuit connections of a signal bridge circuit provided by a first modified embodiment of the first embodiment of the present disclosure.
Figure 12:
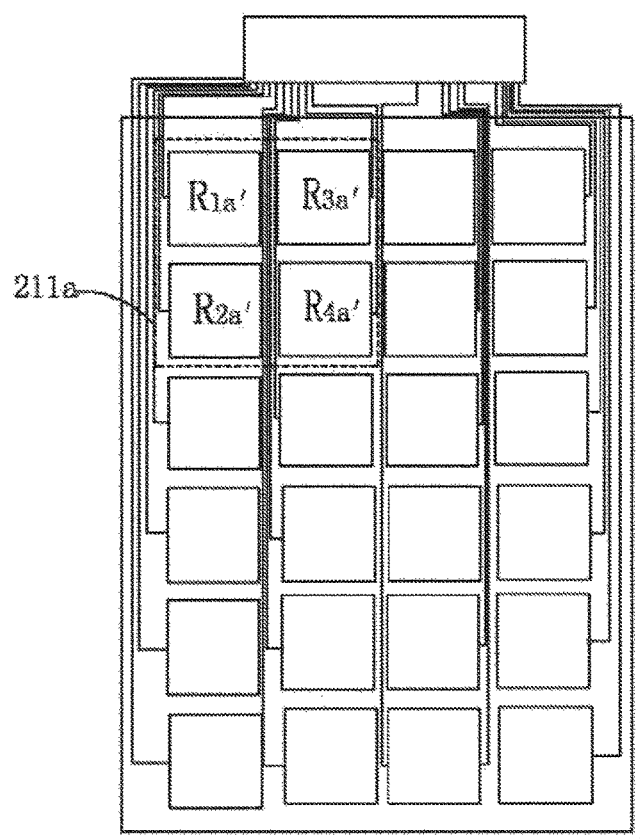
FIG. 12 is a schematic diagram showing a relationship of circuit connections of the bridge circuits shown in the FIG. 11.

Referring to FIG. 11 and FIG. 12, in a first modified embodiment of the first embodiment of the present disclosure, an actual practice of a pressure sensing module is provided. In the first modified embodiment, the pressure sensing module includes plural bridge circuits 211a arranged in a matrix and disposed on a surface of a substrate (not shown). The bridge circuit 211a includes four resistors including a resistor $R_{1a'}$, a resistor $R_{2a'}$, a resistor $R_{3a'}$ and a resistor $R_{4a'}$. A difference between the first modified embodiment and the first embodiment is that a joint region 212 can be connected to a selection chip 213, and the selection chip 213 includes a selection switch (not shown), and the selection switch are connected to a pressure sensing circuit 214 and a touch control sensing circuit 215. In this embodiment, to achieve pressure sensing and touch control sensing, preferably, a scanning process is performed in a manner of time-division.

Specifically, when a scanning period is performed for pressure sensing (i.e., a first time interval), the selection switch of the selection chip 213 is switched to conductively connect the selection switch to the pressure sensing circuit 214 to enable the pressure sensing circuit 214 to be conductively connected to the resistor $R_{1a'}$, the resistor $R_{2a'}$, the resistor $R_{3a'}$ and the resistor $R_{4a'}$. After being pressed by the finger, variation of strains and resistance values of the resistor $R_{1a''}$ the resistor $R_{2a''}$ the resistor $R_{3a'}$ and the resistor $R_{4a'}$ are caused because a volume of each of the resistor $R_{1a''}$ the resistor $R_{2a''}$ the resistor $R_{3a'}$ and the resistor $R_{4a'}$ is varied, and thus a force value of the pressing of the finger is sensed in accordance with the values of the strains.

When the scanning period is performed for touch control sensing (i.e., a second interval), the selection switch (not shown) of the selection chip 213 is switched to conductively connect the selection switch to the touch control sensing circuit 215 to enable the touch control sensing circuit 215 to be conductively connected to the resistor $R_{1a''}$ the resistor $R_{2a''}$ the resistor $R_{3a'}$ and the resistor $R_{4a''}$ thereby sensing a position of the pressing of the finger through a self-capacitance sensing mode.

In this modified embodiment, two wires are used for each of the resistors $R_{1a'}$-$R_{4a'}$ of the bridge circuit 211a to obtain an electric signal thereof. This arrangement benefits decrease of a resistance value corresponding to the transmission of the electric signal of each of the resistors $R_{1a'}$-$R_{4a''}$. In this embodiment, a principle of self-capacitance is used sense the pressing of the finger, thereby enabling the resistors $R_{1a'}$-$R_{4a'}$ to work independently and to not affect each other.

To enable the sensing performance of the pressure sensing module to be improved, in this modified embodiment, plural bridge circuits 211a are arranged as shown in FIG. 12. The bridge circuits 211a are arranged in a matrix and disposed on a single surface. Through this design and the time-division scanning, multi force touch sensing can be further achieved.

Figure 13:
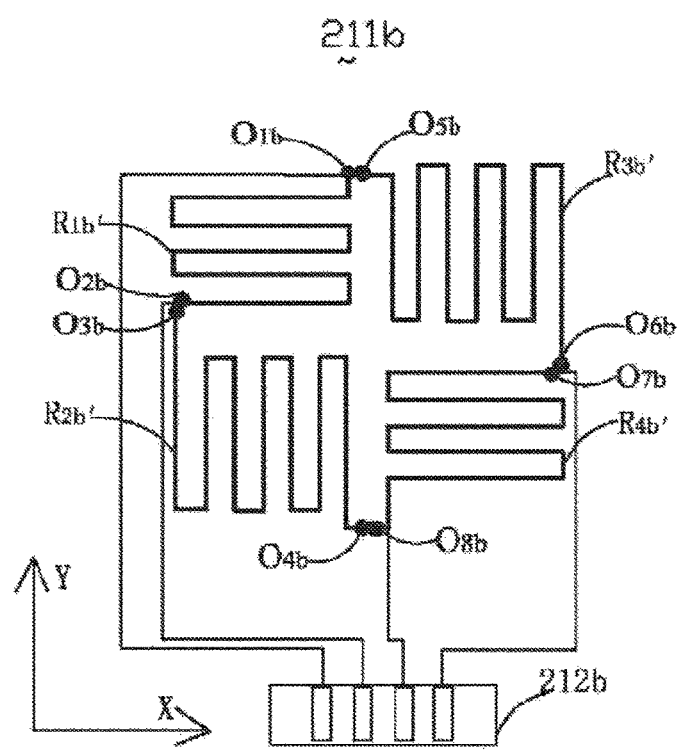
FIG. 13 is a schematic diagram showing a relationship of circuit connections of a signal bridge circuit provided by a second modified embodiment of the first embodiment of the present disclosure.

As shown in FIG. 13, in a second modified embodiment of the first embodiment of the present disclosure, a bridge circuit 211b is provided. The bridge circuit 211b includes a resistor $R_{1b''}$ a resistor $R_{2b''}$ a resistor $R_{3b'}$ and a resistor $R_{4b''}$. The resistor $R_{1b'}$ includes a first node $O_{1b}$ and a second node $O_{2b}$, the resistor $R_{2b'}$ includes a third node $O_{3b}$ and a fourth node $O_{4b}$, the resistor $R_{3b'}$ includes a fifth node $O_{5b}$ and a sixth node $O_{6b}$, and the resistor $R_{4b'}$ includes a seventh node $O_{7b}$ and an eighth node $O_{8b}$. A difference between the second modified implementation manner and the first embodiment is:

The first node $O_{1b}$ and the fifth node $O_{5b}$ form a first input port (i.e., the terminal B in FIG. 3) through the electric connection of the pattern shapes;

The second node $O_{2b}$ and the third node $O_{3b}$ form a first output port (i.e., the terminal A in FIG. 3) through the electric connection of the pattern shapes;

The fourth node $O_{4b}$ and the eighth node $O_{8b}$ form a second input port (i.e., the terminal D in FIG. 3) through the electric connection of the pattern shapes; and The sixth node $O_{6b}$ and the seventh node $O_{7b}$ form a second output port (i.e., the terminal C in FIG. 3) through the electric connection of the pattern shapes.

The first output port, the second output port, the first input port and the second input port are independently wired to a joint region 212b to enable the resistor $R_{1b''}$ the resistor $R_{2b''}$ the resistor $R_{3b'}$ and the resistor $R_{4b'}$ to form the Wheatstone bridge as shown in FIG. 3 and FIG. 4.

In some embodiments of the present disclosure, the electric connection formed between the two of the nodes and formed through the pattern shape means that a newly added metal wire is used to achieve the electric connection between the two independent resistors each of which is formed from a metal wire.

Further, the time-division scanning in the first modified embodiment is used to scan the bridge circuit 211b. After being pressed by the finger, a background capacitance between a ground terminal and the bridge circuit 211b adjacent to the finger is activated to generate a position sensing signal, when the self-capacitance sensing mode is applied.

Figure 14:
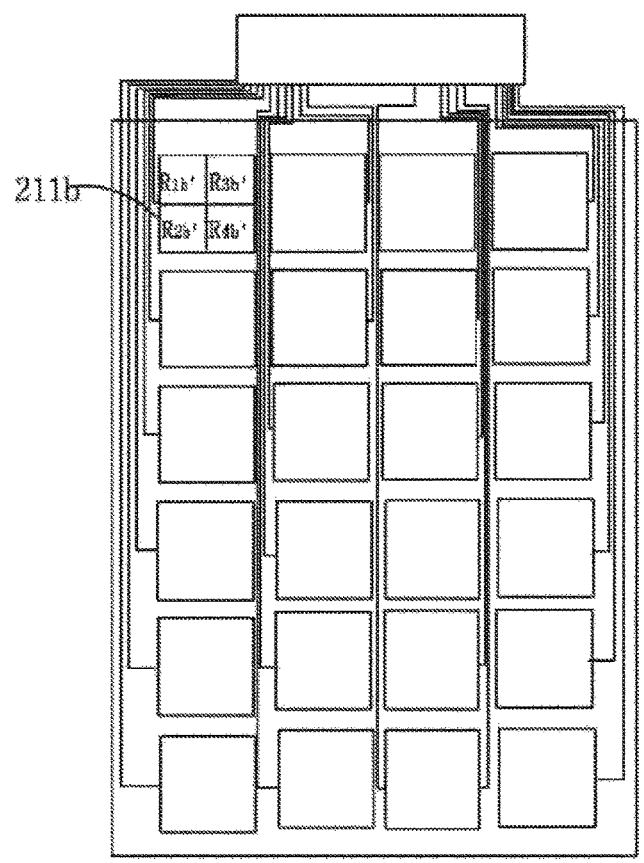
FIG. 14 is a schematic diagram showing a relationship of circuit connections of the bridge circuits shown in the FIG. 13.

In this modified embodiment, plural bridge circuits 211b are arranged as shown in FIG. 14. The bridge circuits 211b are arranged in a matrix and disposed on a single surface of a substrate.

Figure 15:
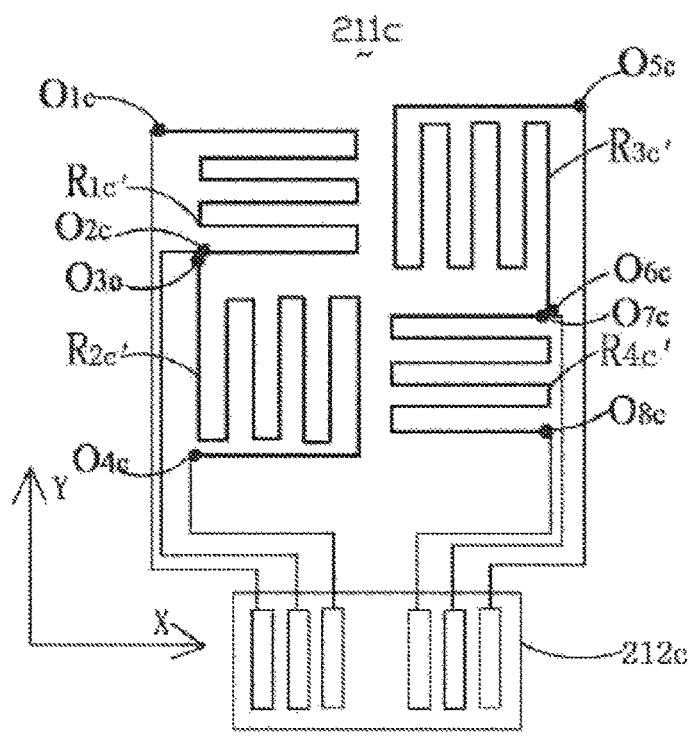
FIG. 15 is a schematic diagram showing a relationship of circuit connections of a signal bridge circuit provided by a third modified embodiment of the first embodiment of the present disclosure.

As shown in FIG. 15, in a third modified embodiment of the first embodiment of the present disclosure, a bridge circuit 211c is provided. The bridge circuit 211c includes a resistor $R_{1c''}$ a resistor $R_{2c''}$ a resistor $R_{3c'}$ and a resistor $R_{4c''}$. The resistor $R_{1c'}$ includes a first node $O_{1c}$ and a second node $O_{2c}$, the resistor $R_{2c'}$ includes a third node $O_{3c}$ and a fourth node $O_{4c}$, the resistor $R_{3c'}$ includes a fifth node $O_{5c}$ and a sixth node $O_{6c}$, and the resistor $R_{4c'}$ includes a seventh node $O_{7c}$ and an eighth node $O_{8c}$. A difference between the third modified implementation manner and the first embodiment is:

The first node $O_{1c}$ and the fifth node $O_{5c}$ are independently wired to the joint region 212c, and are connected within the joint region 212c to form a first input port (i.e., the terminal B in FIG. 3);

The second node $O_{2c}$ and the third node $O_{3c}$ form a first output port (i.e., the terminal A in FIG. 3) through the electric connection of the pattern shapes;

The fourth node $O_{4c}$ and the eighth node $O_{8c}$ are independently wired to the joint region 212c, and are connected within the joint region 212c to form the second input port (i.e., the terminal D in FIG. 3); and The sixth node $O_{6c}$ and the seventh node $O_{7c}$ form a second output port through the electric connection of the pattern shapes.

The first output port and the second output port (i.e., the terminal C in FIG. 3) are independently wired to the joint region 212c. In this modified embodiment, the arrangement of plural bridge circuits 211c is shown as FIG. 12 and FIG. 14.

Further, the time-division scanning in the first modified embodiment is used to scan the bridge circuit 211c. After being pressed by the finger, a background capacitance between a ground terminal and the bridge circuit 211c adjacent to the finger is activated to generate a position sensing signal, when the self-capacitance sensing mode is applied.

In the first modified embodiment to the third modified embodiment of the present embodiment, the arrangement and number of the bridge circuits shown in FIG. 12 or FIG. 14 are merely used as an example. For actual practice, the specific arrangement and number of the bridge circuits can be adjusted in accordance with actual demands, and not limited herein.

In some preferred modified embodiments of the present embodiment, the four resistors of the bridge circuit 211a (the bridge circuit 211b or the bridge circuit 211c) and the joint region corresponding to the four resistors can be wired in a following method. At first, a conductive layer (not shown) is added and an insulation layer (not shown) is disposed to enable the four resistors to be electrically insulated. Then, through holes (not shown) are defined in the insulation layer, and locations of the through holes correspond to the nodes. The through holes can be filled with conductive material, and the electric connection between the joint region 212 (the joint region 212b or the joint region 212c) and the four resistors cab achieved through the conductive material used to fill the through holes. Therefore, by using the above method of defining the through holes, it is not necessary to dispose wires between the bridge circuits 211a (or the bridge circuits 211b), and then gaps between the bridge circuits 211a (or the bridge circuits 211b) are decreased simultaneously, thereby increasing a resolution of a touch screen.

Figure 16:
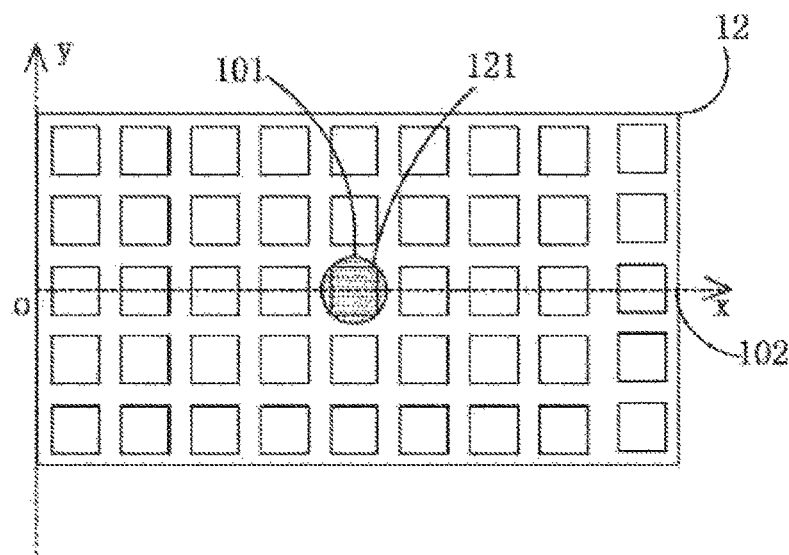
FIG. 16 is a schematic diagram showing a distribution of pressure sensing units on a surface of a sensing layer in accordance with the first embodiment of the present disclosure.

In the present disclosure, to enable the pressure sensing module 10 to have better performance for pressure sensing, the sensing layer 12 in the pressure sensing module has a width and a length different from each other, as shown in FIG. 16. For example, a ratio of length to width of the sensing layer 12 in the pressure sensing module is 2:1. A distribution density of the pressure sensing units 121 disposed on a surface of the sensing layer 12 is at least 1 per $cm^2$. For actual practice, the distribution density of the pressure sensing units 121 disposed on the surface of the sensing layer 12 is not limited. A distribution density enabling the pressure sensing module 10 to have better performance for pressure sensing can be used as a standard for the distribution density of the pressure sensing units 121.

In some preferred embodiments of the present disclosure, the distribution manner and the distribution density of the pressure sensing units 121 and the ratio of length to width of the sensing layer 12 are determined in accordance with a size of an intelligent display screen to be fabricated, and thus the distribution manner and the distribution density of the pressure sensing units 121 and the ratio of length to width of the sensing layer 12 are not distinctively limited herein. After the sensing layer is pressed by the finger, a problem that the output voltage $U_0$ before/after the sensing layer is pressed by the finger cannot be calculated correctly is caused, because the forces applied on the pressure sensing units 121 along different directions and the values of the strain caused are the same. The above arrangement is capable of preventing the sensing layer from suffering the problem.

In a preferred embodiment, a center line of the sensing layer 12 in a length direction of the sensing layer 12 is defined as an X axis, a side of the sensing layer 12 in a width direction of the sensing layer 12 is defined as a Y axis, and an intersection point of the side of the sensing layer 12 and the center line of the sensing layer 12 in the length direction is defined as an origin point, thereby defining an X-Y coordinate system.

Figure 17:
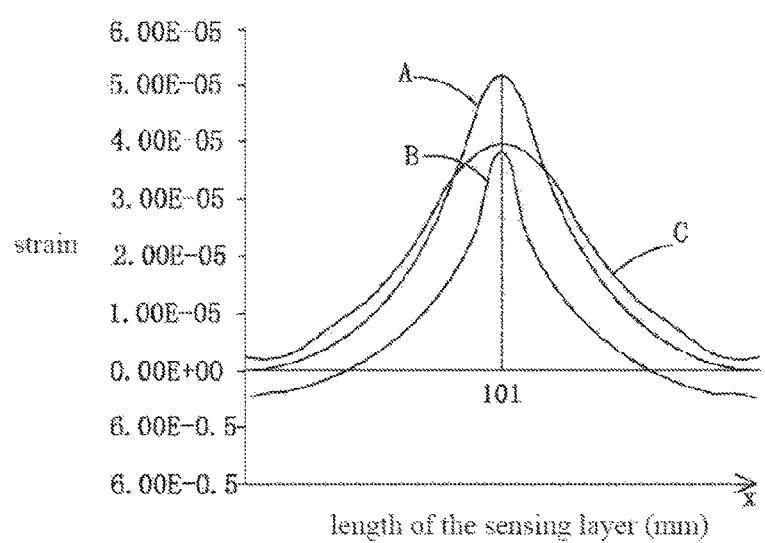
FIG. 17 is a schematic diagram showing curves representing variations of size—strain of a sensing layer in a pressure sensing module after the sensing layer is affected by pressing.

When a pressing position 101 on the sensing layer 12 is pressed by the finger, a straight line 102 parallel with the defined X axis and passing through the pressing position 101 is selected. In a case of actual pressing, the strain of the pressure sensing units 121 passing through the straight line 102 in the X-direction is different from the strain of the pressure sensing units 121 passing through the straight line 102 in the Y-direction. Further, the value of the length of the sensing layer 12 is defined as a row coordinate, and the values of the strain generated after the pressure sensing units 121 disposed along the straight line 102 are pressed are defined as a column coordinate, thereby drawing a diagram showing the values of the strain of the pressure sensing units 121 distributed along the straight line 102 and variances of the distances between the pressure sensing units 121 and a pressing position. As shown in FIG. 17, a line A represents values of Y-direction strain of the pressure sensing units 121 disposed alone the straight line 102, a line B represents values of X-direction strain of the pressure sensing units 121 disposed alone the straight line 102, and a line C represents absolute values of the differences between the values of X-direction strain and the values of Y-direction strain of the pressure sensing units 121 disposed alone the straight line 102.

It can be understood from FIG. 17 that the strains in the X-direction and the Y-direction generated at the pressing position 101 are greater. With increasing of a distance between each of the pressure sensing units 121 and the pressing position 101, the X-direction strains and the Y-direction strains corresponding to the pressure sensing unit 121s are gradually decreased.

As shown in FIG. 17, with respect to the absolute value of the difference between the value of the X-direction strain and the value of the Y-direction strain of a single pressure sensing units 121, a maximum of the absolute value of the difference between the value of the X-direction strain and the value of the strain in the X-direction and the Y-direction corresponding to the pressure sensing unit 121 is measured to obtain the output voltage $U_0$ corresponding to the maximum, in which a value of the output voltage $U_0$ is proportion to the value of the pressing pressure, thereby achieving the function of pressure sensing and eliminating influence on the sensing of the force of the pressing which is caused by temperature. Therefore, the sensitivity of the pressure sensing module for sensing the force of the pressing is effectively increased.

The above method used to select the pressure sensing units 121 is merely an example. For actual practice, plural straight lines can be selected, and values of the X-direction strains and the Y-direction strains of the pressure sensing units 121 located along different straight lines are recorded. In some preferred embodiments, in a pressure sensing layer 12 having a fixed ratio of length to width, variances of the resistance values, generated after the pressure sensing units disposed on different pressing positions are pressed by the finger, can be recoded and stored in a database in advance, thereby simplifying processes of the sensing for pressure touch control performed by the pressure sensing module provided by the present disclosure, increasing speed and accuracy of the sensing, and providing a proposal for fast sensing method for multi force touch sensing.

In the present disclosure, besides adopting the technic proposal provided by the above first embodiment for sensing the force and the position of the pressing of the finger, the sensing for the pressure and the positon can be achieved by introducing a touch control sensing unit in the sensing layer 12.

Figure 18:
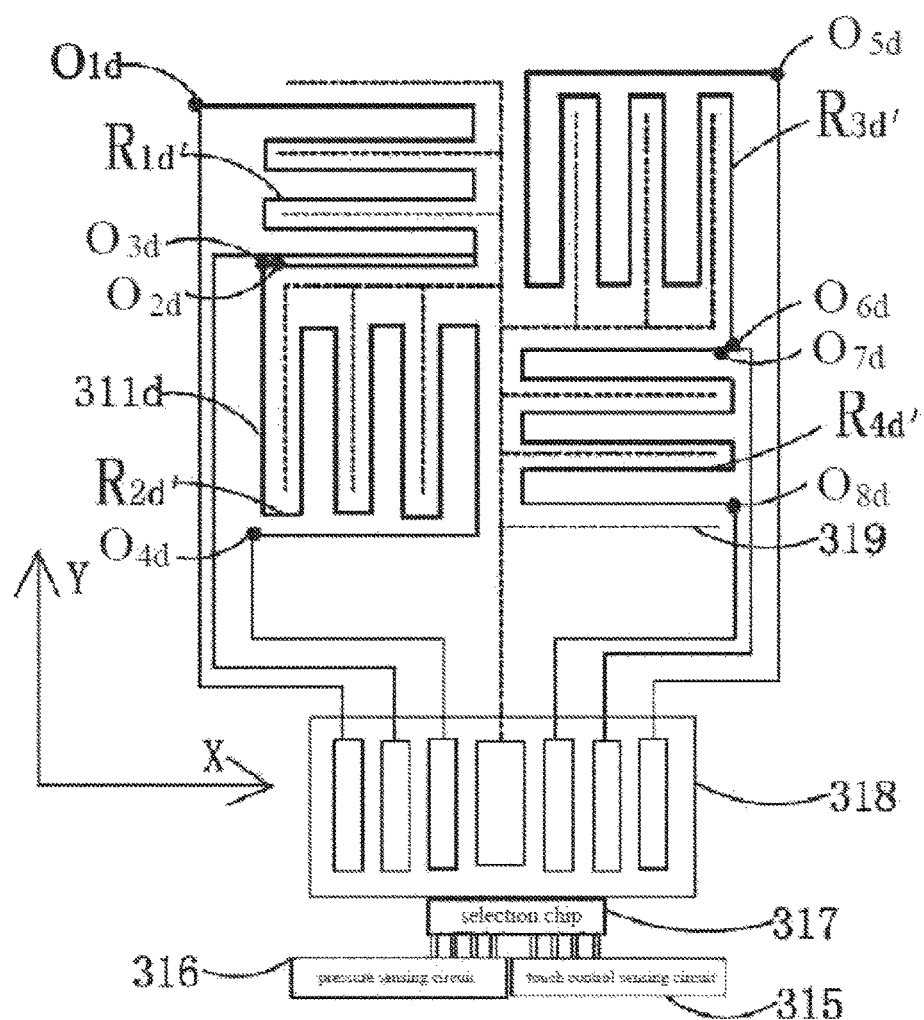
FIG. 18 is a schematic diagram showing a relationship of circuit connections of a signal bridge circuit provided by a second embodiment of the present disclosure.

Referring to FIG. 18 continuously, a second embodiment of the present disclosure provides a pressure sensing touch control system including a substrate and a sensing layer. The sensing layer is formed on a surface of the substrate. The sensing layer includes at least one pressure sensing unit 311d and at least one touch control sensing unit 319. The pressure sensing unit 311d includes four resistors including a resistor $R_{1d'}$, a resistor $R_{2d'}$, a resistor $R_{3d'}$ and a resistor $R_{4d'}$. The touch control sensing unit 319 is disposed between the four resistors. A pattern shape of the touch control sensing unit 319 and the pattern shapes of the four resistors are complementary. The resistors $R_{1d'}$, the resistor $R_{2d'}$, the resistor $R_{3d'}$, the resistor $R_{4d'}$ and the touch control sensing unit 319 are conductively connected to a joint region 318 through wires. The joint region 318 is further connected to a selection chip 317.

In the pressure sensing unit 311d, two resistors with the pattern shapes having the same extending directions are defined as a first resistor group, in which the first resistor group includes the resistor $R_{1d'}$ and the resistor $R_{4d'}$, and the other two resistors with the pattern shapes having the same extending directions are defined as a second resistor group, in which the second resistor group includes the resistor $R_{2d'}$ and the resistor $R_{3d'}$. Further, the resistor $R_{1d'}$ and the resistor $R_{4d'}$ are disposed diagonally, and the resistor $R_{2d'}$ and the resistor $R_{3d'}$ are disposed diagonally.

In this embodiment, the extending direction of the pattern shape of the first resistor group is different from the extending direction of the pattern shape of the second resistor group. Further, the extending direction of the pattern shape of the first resistor group is perpendicular to the extending direction of the pattern shape of the second resistor group.

Similar to the first embodiment of the present disclosure, in this embodiment, a total projection length of the pattern shapes of the resistors along the first direction is greater than a total projection length of the pattern shapes of the resistor along the second direction.

Further, to enable the pressure sensing touch control system to have better performance for sensing the pressure and the position of the pressing of the finger, the sensing layer can be designed to have a width and a length different from each other.

To enable influences on the temperatures of the four resistors to be uniform so as to enable the output voltage $U_O$ caused by temperature to be zero, it is preferred to arrange the four resistors to be adjacent disposed, and a distance between two adjacent resistors of the four resistors is in a range from 1 mm to 10 mm.

A manner of an electric connection between the resistor $R_{1d'}$, the resistor $R_{2d'}$, the resistor $R_{3d'}$ and the resistor $R_{4d'}$ is described as follow:

The resistor $R_{1d'}$ includes a first node $O_{1d}$ and a second node $O_{2d}$, the resistor $R_{2d'}$ includes a third node $O_{3d}$ and a fourth node $O_{4d}$, the resistor $R_{3d'}$ includes a fifth node $O_{5d}$ and a sixth node $O_{6d}$, and the resistor $R_{4d'}$ includes a seventh node $O_{7c}$ and an eighth node $O_{8d}$.

The first node $O_{1d}$ and the fifth node $O_{5d}$ are independently wired to the joint region, and are connected within the joint region form the first input port (i.e., the terminal B in FIG. 3 and FIG. 4).

The second node $O_{2d}$ and the third node $O_{3d}$ form a first output port (i.e., the terminal A in FIG. 3 and FIG. 4) through the electric connection of the pattern shapes.

The fourth node $O_{4d}$ and the eighth node $O_{8d}$ are independently wired to the joint region 318, and are connected within the joint region 318 to form the second input port (i.e., the terminal D in FIG. 3 and FIG. 4).

The sixth node $O_{6d}$ and the seventh node $O_{7d}$ form a second output port (i.e., the terminal C in FIG. 3 and FIG. 4) through the electric connection of the pattern shapes.

Particularly, in this embodiment, the position pressed by the finger is sensed by using a mutual capacitive sensing method. The touch control sensing unit 319 is a receiving electrode (RX electrode), and the pressure sensing unit 311d is a transmitting electrode (TX electrode). The pressure sensing unit 311d used as a transmitting electrode transmits an exciting signal, and the touch control sensing unit 319 used as a receiving electrode receives the exciting signal simultaneously to sense a variance of a value of a capacitance between the pressure sensing unit 311d used as a transmitting electrode and the pressure sensing unit 311d used as a transmitting electrode, thereby calculating a coordinate of a position being touched. In another embodiment of the present disclosure, the touch control sensing unit 319 can be used as a transmitting electrode (TX electrode), and the pressure sensing unit 311d can be used as a receiving electrode (RX electrode). In the present disclosure, the above limitations to the pressure sensing unit 311d and the touch control sensing unit 319 are merely examples, and the present disclosure is not limited thereto.

Specifically, in the present embodiment, time-division scanning is adopted. When a scanning period is performed for pressure sensing (i.e., a first time interval), the bridge circuit 311d is scanned to provide a pressure sensing function of the pressing of the finger for the pressure sensing module. Specifically, the selection chip 317 is switched to be conductively connected to a pressure sensing circuit 316 to enable the pressure sensing unit 311d to be conductively connected to the pressure sensing circuit 316. When the bridge circuit 311d is pressed by the finger, a volume of the pressure sensing unit 311d is varied, thus causing the variation of strain and resistance value. Therefore, a force value of the pressing of the finger is sensed in accordance with the value of the strain.

When the scanning period is performed for touch control sensing (i.e., a second time interval), the selection chip 317 is switched to be conductively connected to a touch control sensing circuit 315 to enable the pressure sensing unit 311d and the touch control sensing unit 319 to be conductively connected to the touch control sensing circuit 315 individually. The touch control sensing circuit 315 provides a driving signal to the touch control sensing unit 319 and senses a touch control sensing signal generated by a capacitance between the pressure sensing unit 311d and the touch control sensing unit 319, and the position pressed by the finger can be obtained in accordance with the touch control sensing signal.

When the arrangements of the touch control sensing unit 319 and the pressure sensing unit 311d provided by this embodiment are adopted, the touch control sensing unit 319 and the pressure sensing unit 311d can be tightly arranged, thereby achieving more sensitive reaction to the force of the pressing of the finger to increase accuracy of the sensing for pressure touch control.

In some preferred modified embodiments of the present embodiment, the resistors $R_{1d'}$-$R_{4d'}$ of the bridge circuit 311d and the joint region 318 can be wired in a following method. At first, a conductive layer (not shown) is added and an insulation layer (not shown) is disposed to enable the resistors $R_{1d'}$-$R_{4d'}$ to be electrically insulated. Then, through holes (not shown) are defined in the insulation layer, and locations of the through holes correspond to the nodes. The through holes can be filled with conductive material, and the electric connection between the joint region 318 and the four resistors cab achieved through the conductive material used to fill the through holes. Therefore, by using the above method of defining the through holes, it is not necessary to dispose wires between the bridge circuits 311d, and then gaps between the bridge circuits 311d are decreased simultaneously, thereby increasing a resolution of a touch screen.

Compared with conventional technologies, the pressure sensing module and the pressure sensing touch control system provided by the present disclosure have advantages described as follows:

(1) The pressure sensing module provided by the present disclosure has a sensing layer formed on a surface of a substrate. The sensing layer includes at least one pressure sensing unit, the pressure sensing unit includes four resistors having the same resistance values, and the four resistors form a Wheatstone bridge, in which pattern shapes of two of the resistors have the same extending directions, and two resistors with the pattern shapes having the same extending directions are not disposed adjacent to each other. The pressure sensing module of the present disclosure is adopted to overcome distortion of a sensing signal representing a magnitude of a pressing force, in which the distortion of the sensing signal is caused by a variance of the sensing signal that is generated when the pressure sensing module is influenced by the ambience (for example, temperature). In the present disclosure, a bridge circuit is disposed on a single surface to solve problems of temperature and other noise, and a fabrication method of the bridge circuit disposed on a single surface is more simplified and a cost of the fabrication method is lower. The pressure sensing module provided by the present disclosure further has advantages of simple structure and high accuracy of sensing.

(2) In the present disclosure, to enable the output voltage of the pressure sensing unit to be higher, the two resistors with the pattern shapes having the same extending directions are disposed diagonally to increase the accuracy of the pressure sensing. In addition, two resistors with the pattern shapes having the same extending directions are defined as a first resistor group, and the other resistors are defined as a second resistor group. The extending direction of the pattern shape of the first resistor group is perpendicular to the extending direction of the pattern shape of the second resistor group, and then the directions of the strains generated after the pattern shapes of the resistors disposed in the same side receive the finger-pressing action is enabled to be more concentrated, thereby obtaining higher values of strains (i.e., the strain of the X-direction $\varepsilon_x$ and the strain of the Y-direction $\varepsilon_y$).

(3) In the pressure sensing module, each of the four resistors is formed from a metal wire, and a node is disposed on each of two ends of the metal wire. In the present disclosure, the four resistors can be individually wired to the joint region, and form corresponding input ports and output ports within the joint region. The four resistors can also be independently wired to the joint region through the pattern shapes to form corresponding input ports and output ports. When the above design is adopted, the signal-to-noise ratio between the resistors can be lowered, thereby increasing the accuracy of the signal of the pressure sensing.

(4) In the pressure sensing module, the length of the sensing layer is different from the width of the sensing layer. When the pressure sensing module receives the finger-pressing action, more obvious stain differences can be obtained in the length direction and the width direction, thereby enabling the pressure sensing unit to obtain strains having greater differentiation to enable the output voltage of the pressure sensing unit obtained through the calculation of the above equation (9) to be higher.

(5) In the pressure sensing module, a distribution manner of the pressure sensing units on the sensing layer enables the pressure sensing module to obtain effective signal feedback, thereby increasing accuracy of the sensing for pressure.

(6) In the pressure sensing module provided by the present disclosure, a process of the time-division scanning is performed on the pressure sensing unit to enable the pressure sensing unit to provide a pressure sensing function of the pressing of the finger for the pressure sensing module in the first time interval, and to provide a positon sensing function of the pressing of the finger for the pressure sensing module in the second time interval. Therefore, the sensing for the pressure and the position of the pressing of the finger can be achieved by using the electrode disposed in a single surface and using different scanning manners.

(7) The present disclosure further provides a pressure sensing touch control system including a sensing layer formed on a substrate. The sensing layer includes at least one pressure sensing unit and at least one touch control sensing unit. The pressure sensing unit includes four resistors having the same resistances. The touch control sensing unit is disposed between the four resistors. By arranging the pressure sensing unit and the touch control sensing unit on the same surface, electrodes thereof can be disposed on a single surface, thereby eliminating influence factors such as temperature on to the pressing of the finger, so as to achieve high accuracy and sensitivity of the sensing for pressure and a positon of touch control.

(8) A pattern shape of the touch control sensing unit and the pattern shapes of the four resistors are complementary to enable the combination of the touch control sensing unit and the four resistors to be tighter, thereby increasing accuracy of sensing for 3D touch control.

(9) In the present disclosure, the pressure sensing unit and the touch control sensing unit are scanned by the time-division scanning individually, in which in a first period, the pressure sensing unit is scanned to provide a pressure sensing function of the pressing of the finger, and in the second period, the touch control sensing unit is used as a transmitting electrode and the pressure sensing unit is used as a receiving electrode, or the touch control sensing unit is used as a receiving electrode and the pressure sensing unit is used as a transmitting electrode. In the present disclosure, the touch control sensing unit and the pressure sensing unit work together to provide sensing for the position of the pressing of the finger for the pressure sensing module. The time-division scanning is provided to further improve the electrode disposed on the single surface, so as to achieve signal obtaining of the sensing for pressure touch control and position touch control, thereby increasing accuracy of the sensing for the pressure value and the position of the pressing of the finger which is performed on the pressure sensing touch control system.

(10) In the present disclosure, the pressure sensing touch control system further includes a selection chip. In the first period, the selection chip enables the pressure sensing unit to be conductively connected to the pressure sensing circuit, and in the second period, the selection chip enables the pressure sensing unit and the touch control sensing unit to be conductively connected to the touch control sensing circuit individually, thereby achieving effective control to the time-division scanning to increase controllability of the sensing for pressure touch control.

The foregoing descriptions are merely preferred embodiments, and are not intended to limit the present disclosure. Those skilled in the art should realize that equivalent constructions do not depart from the spirit and scope of the present disclosure, and that various changes, substitutions, and alterations may be made herein without departing from the spirit and scope of the present disclosure.

What is claimed is:

1. A pressure sensing touch control system, comprising:
a substrate; and
a sensing layer formed on a surface of the substrate, the sensing layer comprising a pressure sensing unit and a touch control sensing unit, the pressure sensing unit comprising four resistors of substantially the same electrical resistance, the four resistors forming a Wheatstone bridge, wherein:
pattern shapes of two of the four resistors have the same extending direction and are not disposed adjacent to each other,
the touch control sensing unit is disposed between the four resistors; and
the two resistors with the pattern shapes having the same extending direction are defined as a first resistor group, the other two resistors are defined as a second resistor group, and an extending direction of the first resistor group is perpendicular to an extending direction of the second resistor group.

2. The pressure sensing touch control system of claim 1, wherein a pattern shape of the touch control sensing unit and the pattern shapes of the four resistors are complementary.

3. The pressure sensing touch control system of claim 1, wherein the two resistors with the pattern shapes having the same extending direction are disposed diagonally.

4. The pressure sensing touch control system of claim 1, wherein the first resistor group comprises a first resistor and a second resistor, the second resistor group comprises a third resistor and a fourth resistor, the first resistor comprises a first node and a second node, the second resistor comprises a third node and a fourth node, the third resistor comprises a fifth node and a sixth node, the fourth resistor comprises a seventh node and an eighth node, and the pressure sensing touch control system further comprises a joint region.

5. The pressure sensing touch control system of claim 4, wherein the first node and the fifth node are electrically connected within the joint region to form a first input port within the joint region, the second node and the third node are electrically connected within the joint region to form a first output port within the joint region, the fourth node and the eighth node are electrically connected within the joint region to form a second input port within the joint region, and the sixth node and the seventh node are electrically connected within the joint region to form a second output port within the joint region.

6. The pressure sensing touch control system of claim 4, wherein the first node and the fifth node are independently wired to the joint region and are electrically connected within the joint region to form a first input port, the second node and the third node form a first output port through pattern shape electric connection, the fourth node and the eighth node are independently wired to the joint region and are connected within the joint region to form a second input port, and the sixth node and the seventh node form a second output port through pattern shape form the second input port, and the first output port and the second output port are independently wired to the joint region and connected within the joint region.

7. The pressure sensing touch control system of claim 1, wherein a width of the sensing layer is not equal to a length of the sensing layer.

8. The pressure sensing touch control system of claim 1, wherein time-division scanning is performed on the pressure sensing unit, so as to enable the pressure sensing unit to perform pressure sensing on pressing of a finger for the pressure sensing touch control system in a first time interval, and to perform a position sensing on the pressing of the finger for the pressure sensing touch control system in a second time interval.

9. A pressure sensing touch control system, comprising:
a first pressure sensing unit, wherein:
the pressure sensing unit comprises a first set of four resistors,
the first set of four resistors form a first Wheatstone bridge,
an extending direction of a first resistor of the first set of four resistors and an extending direction of a second resistor of the first set of four resistors is the same,
an extending direction of a third resistor of the first set of four resistors and an extending direction of a fourth resistor of the first set of four resistors are the same, and the extending direction of the first resistor and the extending direction of the second resistor are different than the extending direction of the third resistor and the extending direction of the fourth resistor.

10. The pressure sensing touch control system of claim 9, wherein the extending direction of the first resistor and the extending direction of the second resistor are perpendicular to the extending direction of the third resistor and the extending direction of the fourth resistor.

11. The pressure sensing touch control system of claim 9, further comprising:
a second pressure sensing unit, wherein:
the second pressure sensing unit comprises a second set of four resistors, different than the first set of four resistors, and
the second set of four resistors form a second Wheatstone bridge different than the first Wheatstone bridge.

12. The pressure sensing touch control system of claim 9, wherein the first resistor has a first width, measured in the extending direction of the first resistor, at a first location and a second width, measured in the extending direction of the first resistor, at a second location.

13. The pressure sensing touch control system of claim 9, wherein the first resistor comprises a plurality of projections.

14. The pressure sensing touch control system of claim 13, further comprising:
a touch control sensing unit, wherein the touch control sensing unit is disposed between a first projection of the plurality of projections and a second projection of the plurality of projections.

15. The pressure sensing touch control system of claim 14, wherein the touch control sensing unit is disposed between at least one of:
the first resistor and the second resistor,
the first resistor and the third resistor,
the first resistor and the fourth resistor,
the second resistor and the third resistor,
the second resistor and the fourth resistor, or
the third resistor and the fourth resistor.

16. The pressure sensing touch control system of claim 9, further comprising:
a touch control sensing unit disposed between the first resistor and the second resistor.

17. A pressure sensing touch control system, comprising:
a pressure sensing unit, wherein:
the pressure sensing unit comprises a set of four resistors,
the first set of four resistors form a Wheatstone bridge,
an extending direction of a first resistor of the set of four resistors and an extending direction of a second resistor of the set of four resistors is the same, and
the first resistor has a first width, measured in the extending direction of the first resistor, at a first location and a second width, measured in the extending direction of the first resistor, at a second location.

18. The pressure sensing touch control system of claim 17, wherein the extending direction of the first resistor and the extending direction of the second resistor are different than at least one of an extending direction of a third resistor of the set of four resistors or an extending direction of a fourth resistor of the set of four resistors.

19. The pressure sensing touch control system of claim 18, wherein the extending direction of the first resistor and the extending direction of the second resistor are perpendicular to the at least one of the extending direction of the third resistor or the extending direction of the fourth resistor.

20. The pressure sensing touch control system of claim 17, wherein each resistor of the set of four resistors are part of a sensing layer formed on a surface of a substrate.

* * * * *